Oct. 2, 1923. 1,469,649
F. J. SINKULA ET AL
HAND REST FOR FISHING REELS
Filed Sept. 22, 1922
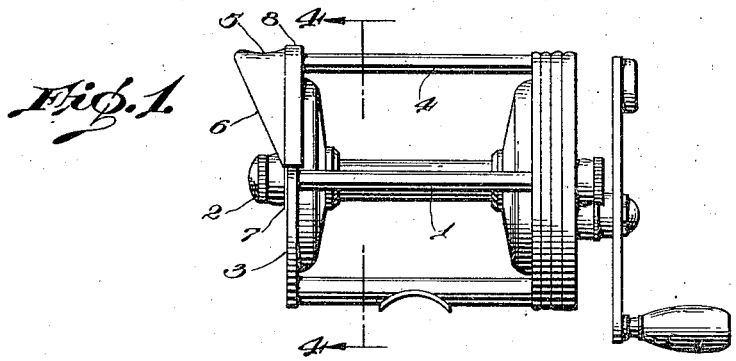
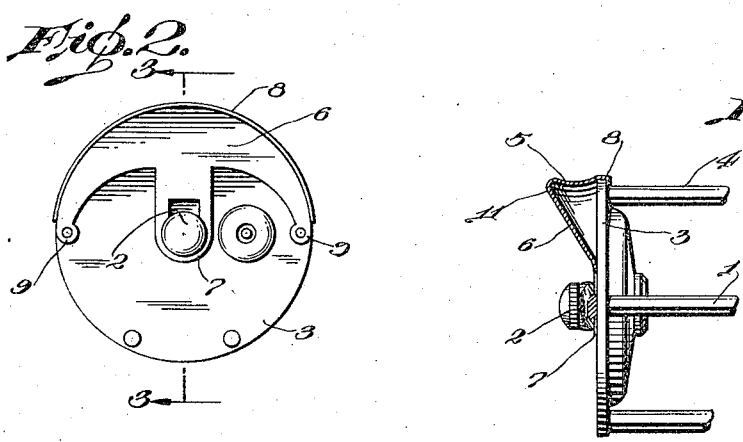
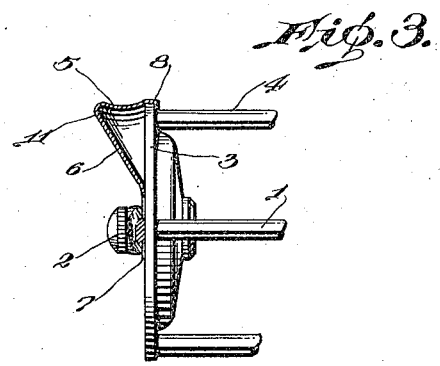
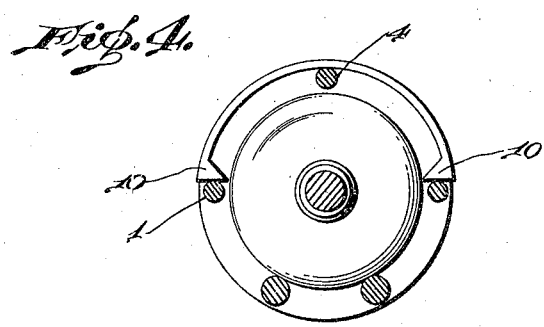
INVENTORS
Francis J. Sinkula
and H. H. Kowitz
BY
Victor J. Evans
ATTORNEY.

Patented Oct. 2, 1923.

1,469,649

UNITED STATES PATENT OFFICE.

FRANCIS J. SINKULA AND HERMAN H. KOWITZ, OF PEMBINE, WISCONSIN.

HAND REST FOR FISHING REELS.

Application filed September 22, 1922. Serial No. 589,947.

*To all whom it may concern:*

Be it known that we, FRANCIS J. SINKULA and HERMAN H. KOWITZ, citizens of the United States, residing at Pembine, in the county of Marinette and State of Wisconsin, have invented new and useful Improvements in Hand Rests for Fishing Reels, of which the following is a specification.

This invention relates to a hand rest for fishing reels and has for its primary object the construction of a device that may be readily attached to reels now in use and when in place to allow more effective grip between the hand of the user and the reel.

An object of the invention is the construction of a hand rest that will protect the hand of the user from being cut upon the reel.

Besides the above our invention is distinguished in the novel form of rest that is so shaped that the same may be very rigidly connected to a reel.

With these and other objects in view the invention will be better understood from the following detailed description taken in connection with the accompanying drawing wherein:

Fig. 1 is a side elevation of the reel showing our improved rest applied thereto.

Fig. 2 is an end elevation.

Fig. 3 is a sectional view on the line 3—3 of Fig. 2 showing the reel in full line.

Fig. 4 is a sectional view on the line 4—4 of Fig. 1.

Again referring to the drawing illustrating one of the many constructions of our invention, the numeral 1 designates a well known form of reel having the clamp nut 2 and the end plate 3 rigidly held in place by the cross bars 4. Our improved rest is formed from sheet metal and has an annular wall 5 and an inclined wall 6 that has projecting therefrom a slotted tongue 7 engaged by the nut 2. The wall 5 has its edge portion formed into a bead 8 that engages over the peripheral edge of the plate 3. Apertured lugs 9 also project from the inclined wall and are secured to the ends of the cross bars 4. To complete the invention clips 10 extend from the bead and engage behind the plate 3 and thus it will be seen that the various parts are so arranged and coact in such a manner that the rest is rigidly connected to the reel. In the use of the reel the palm of the hand is brought into engagement with the end plate 3 and the overhanging lip 11 extends slightly over the hand thereby accomplishing a very effective grip between the hand and reel while at the same time allowing the fingers to easily manipulate the line and support the pole.

It is, of course, to be understood that the invention may be constructed in various other manners and the parts associated in different relations and, therefore, we do not desire to be limited in any manner except as set forth in the claims hereunto appended.

Having thus described our invention what we claim is:

1. A hand rest for fishing reels comprising a plate stamped to embrace one of the end plates of the reel and having an overhanging lip.

2. A hand rest for fishing reels having a bead for engagement over the edge of one of the end plates of the reel, and a tongue for connection to the clamping nut of the reel.

3. A hand rest for fishing reels having a bead for engagement over the edge of one of the end plates of the reel, and a tongue for connection to the clamping nut of the reel, said rest further having clips extending behind the end plate of the reel.

4. A hand rest for fishing reels formed from a metal stamped to have a bead for engagement over the edge of the end plate of the reel, an inclined wall, tongues extending from the wall for engagement with the clamp member of the reel, and clips for engagement behind the end plate of the reel.

5. A hand rest for fishing reels having a curved wall, a second wall arranged at an incline thereto, a sliding tongue extending from said inclined wall, apertured lugs extending from the inclined wall, and clips extending from the curved wall.

In testimony whereof we affix our signatures.

FRANCIS J. SINKULA.
HERMAN H. KOWITZ.